United States Patent
Ding et al.

(10) Patent No.: US 7,469,465 B2
(45) Date of Patent: Dec. 30, 2008

(54) METHOD OF PROVIDING A LOW-STRESS SENSOR CONFIGURATION FOR A LITHOGRAPHY-DEFINED READ SENSOR

(75) Inventors: Meng Ding, Mountain View, CA (US); Kuok San Ho, Santa Clara, CA (US); Tsann Lin, Saratoga, CA (US); Huey-Ming Tzeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 481 days.

(21) Appl. No.: 10/881,581

(22) Filed: Jun. 30, 2004

(65) Prior Publication Data

US 2006/0000079 A1    Jan. 5, 2006

(51) Int. Cl.
*G11B 5/187* (2006.01)

(52) U.S. Cl. .............. 29/603.12; 29/603.15; 29/603.18; 360/122; 360/313; 216/22; 216/41

(58) Field of Classification Search ............... 29/603.12, 29/603.11, 603.15, 603.18, 603.2, 603.21; 360/119, 122, 128, 313, 320; 524/492, 493; 216/22, 41
See application file for complete search history.

(56) References Cited

U.S. PATENT DOCUMENTS

| | | | |
|---|---|---|---|
| 3,821,815 A | | 6/1974 | Abbott et al. |
| 4,225,892 A | | 9/1980 | Bassett et al. |
| 5,321,882 A | * | 6/1994 | Zarouri et al. ........ 29/603.12 X |
| 5,483,735 A | | 1/1996 | Postma et al. |
| 5,586,385 A | * | 12/1996 | Nishino et al. ........... 29/603.16 |
| 5,664,316 A | * | 9/1997 | Chen et al. ............ 29/603.15 X |
| 5,772,493 A | | 6/1998 | Rottmayer et al. |
| 5,850,326 A | | 12/1998 | Takano et al. |
| 5,990,222 A | * | 11/1999 | Watada et al. ............... 524/492 |

(Continued)

FOREIGN PATENT DOCUMENTS

JP    49-93007    9/1973

(Continued)

OTHER PUBLICATIONS

IBM, "Method For Reducing Grinding Damage In MR Heads. Orienting-Disorienting Magnet For Magnetic Particles.",IBM Technical disclosure Bulletin, Feb. 1979, pp. 3512-3516.

*Primary Examiner*—A. Dexter Tugbang
(74) *Attorney, Agent, or Firm*—John J. Oskorep, Esq.; Rambod Nader

(57) ABSTRACT

One illustrative method of fabricating a read sensor of a magnetic head includes the steps of forming a plurality of read sensor layers on a wafer; etching the read sensor layers to form a read sensor structure with a trench in front of the read sensor structure; forming a highly porous material within the trench; and slicing the wafer and lapping the sliced wafer through the highly porous material until an air bearing surface (ABS) of the magnetic head is reached. Advantageously, the highly porous material in front of the read sensor structure reduces mechanical stress on the read sensor during the lapping process. This reduces the likelihood that the amplitude of the read sensor will be degraded or set in a "flipped" or reversed orientation, as well as reduces the likelihood that electrostatic discharge (ESD) damage to the read sensor will occur.

15 Claims, 9 Drawing Sheets

U.S. PATENT DOCUMENTS

| | | |
|---|---|---|
| 5,991,119 A | 11/1999 | Boutaghou et al. |
| 6,178,066 B1 | 1/2001 | Barr |
| 6,181,608 B1 | 1/2001 | Keshavarzi et al. |
| 6,219,205 B1 | 4/2001 | Yuan et al. |
| 6,324,747 B1 | 12/2001 | Boutaghou et al. |
| 6,510,030 B1 | 1/2003 | Song et al. |
| 6,519,204 B2 | 2/2003 | Slamowitz et al. |
| 6,580,586 B1 | 6/2003 | Biskeborn |
| 6,679,760 B2 | 1/2004 | Fukuroi et al. |
| 2003/0006213 A1 | 1/2003 | Biskeborn |

FOREIGN PATENT DOCUMENTS

| | | | |
|---|---|---|---|
| JP | 49-128219 U | 11/1974 | |
| JP | 55004727 | 1/1980 | |
| JP | 60115013 | 6/1985 | |
| JP | 6-28636 * | 2/1994 | ............. 360/128 X |
| JP | 7230610 | 8/1995 | |
| JP | 8077520 | 3/1996 | |

* cited by examiner

METHOD OF PROVIDING A LOW-STRESS SENSOR CONFIGURATION FOR A LITHOGRAPHY-DEFINED READ SENSOR

BACKGROUND OF THE INVENTION

1. Field Of The Invention

The present invention relates to a method of providing a low-stress region adjacent to an embedded read sensor to reduce stress on the read sensor during a lapping process.

2. Description Of The Related Art

The heart of a computer is a magnetic disk drive that includes a magnetic disk, a slider where a magnetic head assembly including write and read heads is mounted, a suspension arm, and an actuator arm. When the magnetic disk is stationary, the slider is biased by the suspension arm into contact with the surface of the magnetic disk. When the magnetic disk rotates, the rotating magnetic disk swirls air at an air bearing surface (ABS) of the slider, causing the slider to fly on an air bearing. When the slider flies on the air bearing, the actuator arm swings the suspension arm to place the magnetic head assembly over selected circular tracks on the rotating magnetic disk, where signal fields are written and read by the write and read heads, respectively. The write and read heads are connected to processing circuitry that operates according to a computer program to implement write and read functions.

An exemplary high performance read head employs a read sensor for sensing the signal fields from the rotating magnetic disk. The most recently explored read sensor, a giant magnetoresistance (GMR) sensor, comprises a nonmagnetic Ni—Cr—Fe seed layer, ferromagnetic Ni—Fe/Co—Fe sense layers, a nonmagnetic Cu—O spacer layer, a ferromagnetic Co—Fe reference layer, a nonmagnetic Ru antiparallel (AP) exchange-coupling layer, a ferromagnetic Co—Fe keeper layer, and nonmagnetic Cu and Ta cap layers. Crystalline reconstruction occurring in the Ni—Cr—Fe seed and Ni—Fe sense layers causes the two layers to behave as if a monolayer film exhibiting coarse polycrystalline grains with a strong <111> texture, thus leading the GMR sensor to exhibit low sensor resistance and a high GMR coefficient. Intrinsic and extrinsic uniaxial anisotropies of the Co—Fe reference and Co—Fe keeper layers, and their ferromagnetic/ferromagnetic AP exchange coupling occurring across the Ru AP exchange-coupling layer cause the Co—Fe reference and Co—Fe keeper layers to be self-pinned, thus leading the GMR sensor to operate properly. Alternatively, an antiferromagnetic Pt—Mn pinning layer is sandwiched into the Co—Fe keeper and Cu cap layers. Ferromagnetic/antiferromagnetic exchange coupling occurring between the Co—Fe keeper and Pt—Mn pinning layers causes rigid pinning to the Co—Fe keeper layer, thus reinforcing the AP exchange coupling pinning and ensuring the proper sensor operation.

In the prior art, the fabrication process of the magnetic head assembly typically includes building the read head on a wafer, building-the write head on the wafer, slicing the wafer into rows, mechanically lapping and overcoating the rows, and slicing the rows into sliders. During building of the read sensor on the wafer, the GMR sensor is conventionally formed using three photolithographic patterning processes.

To illustrate, FIG. 1 shows a top view of an in-process GMR sensor structure 100 according to the prior art. FIGS. 2 and 3 are cross-sectional views of the in-process GMR sensor structure 100 formed in the prior art on planes perpendicular and parallel, respectively, to its ABS. In the first process, a region 101 is formed with a height of about 3,000 nm to 5,000 nm, much larger than the designed height of the GMR sensor 100 (100 nm). An insulating film ($Al_2O_3$) is deposited outside the region 101. In the second process, two regions 102 are formed with a separation equivalent to the designed width of the GMR sensor 100 (120 nm). Longitudinal bias and first conducting layers are deposited into the two regions 102. In the third process, two regions 103 are formed on top of the two regions 102. Second conducting layers are deposited into the two regions 103.

FIGS. 4 and illustrate cross-sectional views of the completed GMR sensor and magnetic head, respectively, in the prior art on a plane perpendicular to its ABS, after mechanical lapping and overcoating. During the mechanical lapping, the height of the GMR sensor 100 is reduced from about 3,000 nm to a designed height of as small as 100 nm. The mechanical lapping is monitored by measuring the resistance of an electrical lapping guide (not shown), having the same structure and geometry as the GMR sensor 100 but located more than 100 µm away from the GMR sensor 100, which is terminated as its resistance substantially increases from about 16 to about $40\Omega$-$50\Omega$. Hence, in the prior art, the designed width of the GMR sensor is defined by photolithographic patterning while its designed height is defined by the mechanical lapping.

There are several disadvantages in forming the GMR sensor according to the prior art. First, electrostatic discharge (ESD) damage may occur during the mechanical lapping indicated by an unwanted substantial increase in the resistance of the GMR sensor. The GMR sensor 100 may thus be not viable at all. Second, the magnetic moments of sense, reference, and keeper layers at the ABS may substantially decrease by uncertain amounts, white the pinning layer may corrode, due to the exposure of the ABS to the chemical solution and air. The designed magnetic moments and desired exchange-coupling may not be attained at the ABS, thus substantially reducing the signal sensitivity of the GMR sensor. Third, all the various layers of the GMR sensor 100 may be recessed differently and an unwanted stepped ABS is formed, due to their different mechanical lapping rates. A protection overcoat 200 of the GMR sensor 100 may thus not adhere well on this stepped ABS, thus causing concerns on the contact of the GMR sensor with the rotating magnetic disk during sensor operation. Because of these problems, the GMR sensors 100 formed in the prior art may not be suitable for magnetic recording at ultrahigh densities.

Finally, the mechanical stresses during the mechanical lapping may also produce electrical overstress (EOS) which may cause the pinning field of the sensor to deviate from being perpendicular to ABS or even to be oriented in a "flipped" or reversed orientation. The latter is referred to as "amplitude flip". Referring ahead to FIG. 15, the problem is depicted more clearly in a graph 1 500. Graph 1500 shows a resistance curve 1502 and an amplitude curve 1504 which are based on signals monitored during the lapping process. As revealed, the amplitude of the read sensor "flips" back and forth between positive and negative polarities at or around the time when the read sensor is exposed from the lapping.

Accordingly, what is needed is a method that reduces the risk of ESD damage and the possibility of amplitude flip in the GMR sensor. What is further needed is a method that controls the sensor resistance, minimizes the losses in the magnetic moments, eliminates corrosion, and precisely controls the height of the GMR sensor.

SUMMARY

One illustrative method of fabricating a read sensor of a magnetic head includes the steps of forming a plurality of read sensor layers on a wafer; etching the read sensor layers to form a read sensor structure with a low-stress region in front of the read sensor structure; and slicing the wafer and lapping the sliced wafer through the low-stress region until an air bearing surface (ABS) of the magnetic head is reached. The low-stress region may be a shallow trench filled with a high-porosity material. The high-porosity material is a material having a low yield strength, e.g. 150 Megapascals (MPa) or less.

Advantageously, the low-stress region in front of the read sensor structure reduces mechanical stress on the read sensor during the lapping process. This reduces the likelihood that the amplitude of the read sensor will be degraded or set in a "flipped" or reversed orientation, as well as reduces the likelihood that electrostatic discharge (ESD) damage to the read sensor will occur.

BRIEF DESCRIPTION OF THE DRAWINGS

For a fuller understanding of the nature and advantages of this invention, as well as the preferred mode of use, reference should be made to the following detailed description read in conjunction with the accompanying drawings.

DETAILED DESCRIPTION OF THE PREFERRED EMBODIMENTS

Figure 1:
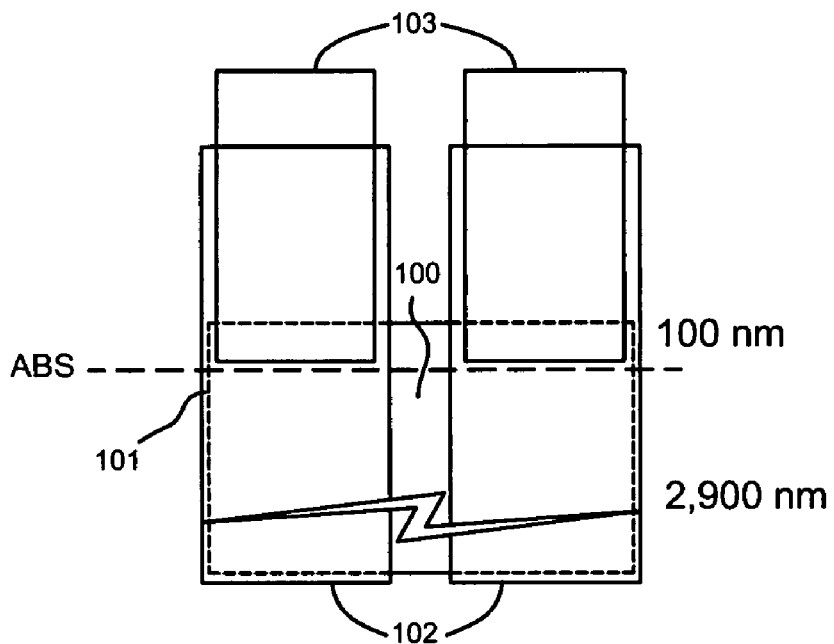
FIG. 1 is a top view of a GMR sensor formed in the prior art.
Figure 2:
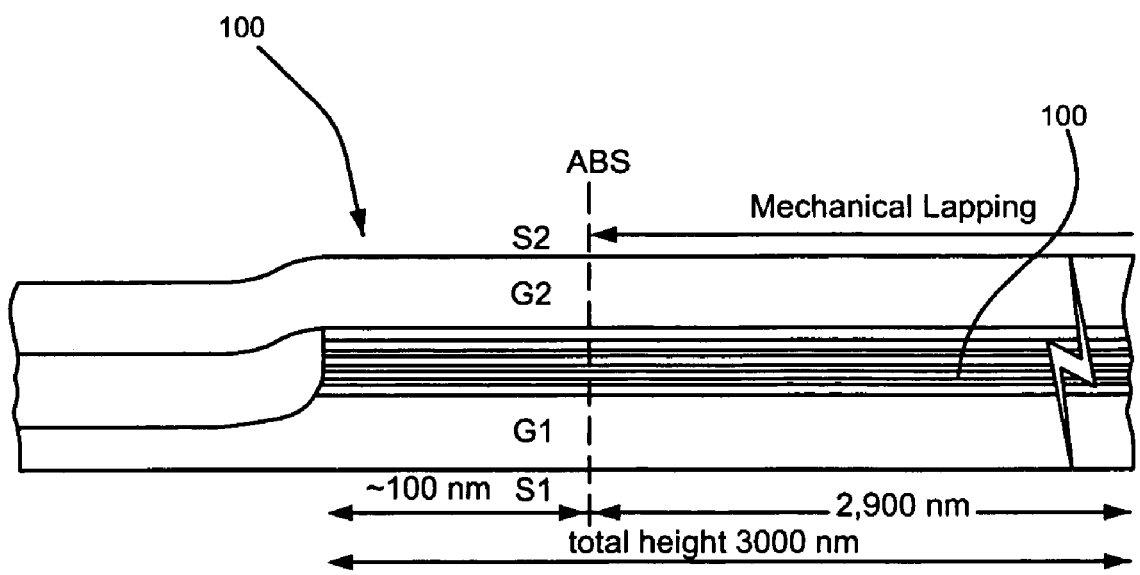
FIG. 2 is a cross-sectional view of a GMR sensor formed in the prior art on a plane perpendicular to its ABS.
Figure 3:
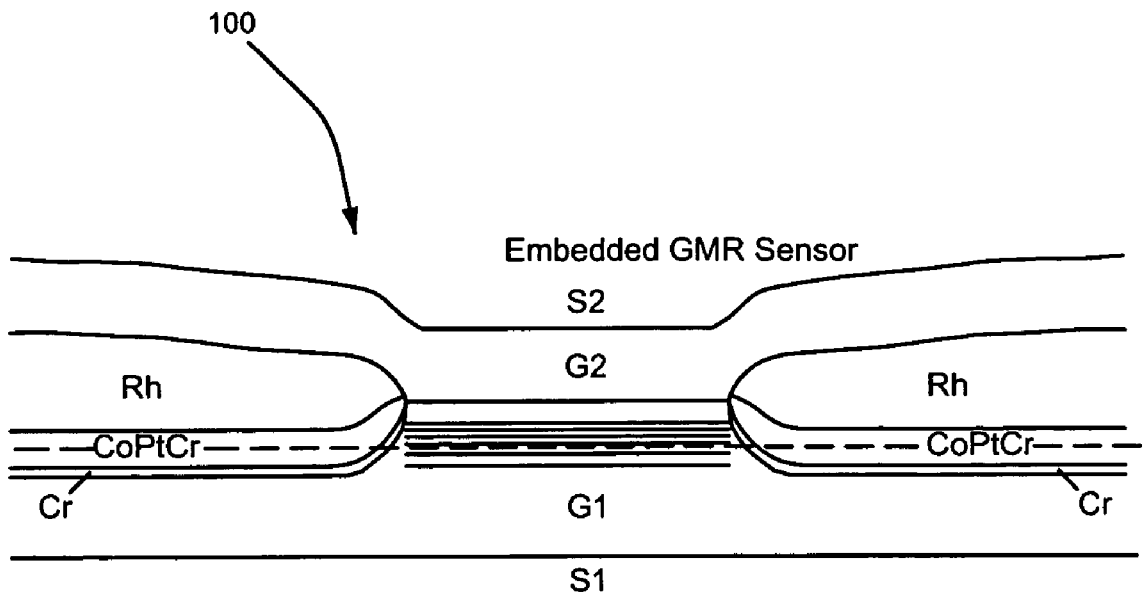
FIG. 3 is a cross-sectional view of a GMR sensor formed in the prior art on a plane parallel to its ABS.
Figure 4:
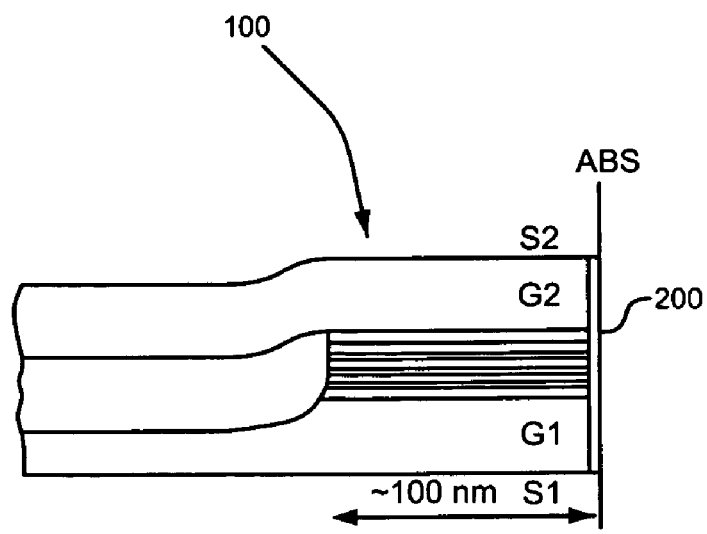
FIG. 4 is a cross-sectional view of a GMR sensor formed in the prior art after mechanical lapping and overcoating, on a plane perpendicular to its ABS.
Figure 5:
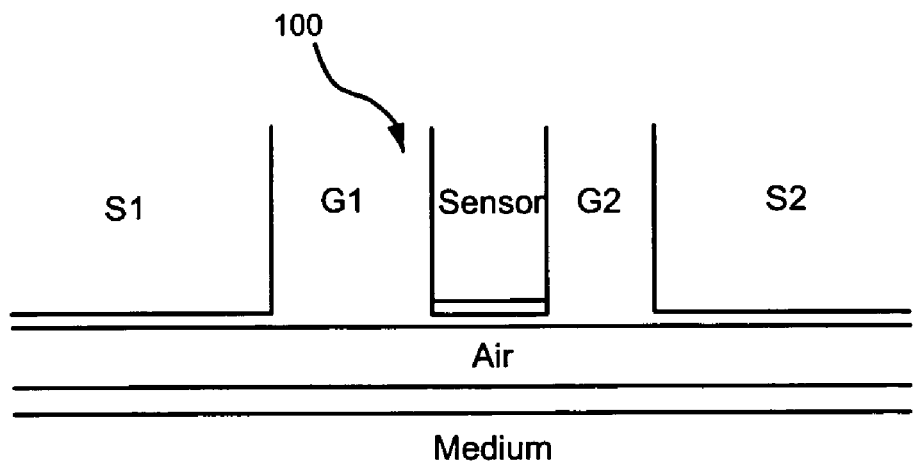
FIG. 5 is a cross-sectional view of a magnetic head assembly fabricated in the prior art on a plane perpendicular to its ABS.

As described herein, one illustrative method of fabricating a read sensor of a magnetic head includes the steps of forming a plurality of read sensor layers on a wafer; etching the read sensor layers to form a read sensor structure with a low-stress region in front of the read sensor structure; and slicing the wafer and lapping the sliced wafer through the low-stress region until an air bearing surface (ABS) of the magnetic head is reached. The low-stress region may be a shallow trench filled with a high-porosity material. The high-porosity material is a material having a low yield strength, e.g. 150 Megapascals (MPa) or less. Advantageously, the low-stress region in front of the read sensor structure reduces mechanical stress on the read sensor during the lapping process. This reduces the likelihood that the amplitude of the read sensor will be degraded or set in a "flipped" or reversed orientation, as well as reduces the likelihood that electrostatic discharge (ESD) damage to the read sensor will occur.

The embedded read sensor of the present application may be a giant magnetoresistance (GMR) sensor used in either a current-in-plane (CIP) or a current-perpendicular-to-plane (CPP) mode. Alternatively, the embedded read sensor may be a tunneling magnetoresistance (TMR) sensor used in a CPP mode. In the detailed method, three lithographic patterning processes are performed for defining the designed height of the embedded read sensor, defining its designed width, and connecting it with conducting layers. During these processes, a trench is formed in front of the read sensor in between the read sensor and an in-line lapping guide. The trench is filled with a highly porous material. After the wafer is sliced, a mechanical lapping process is utilized. The lapping is performed by measuring the resistance of a parallel circuit of the embedded read sensor and the in-line lapping guide until an air bearing surface (ABS) of the magnetic head is reached. During the lapping, the highly porous material serves as a buffer to reduce a mechanical stress field from coupling to the read sensor.

There are several advantages provided by present method. Primarily, ESD damage and amplitude flip can be prevented during the mechanical lapping. This is because the in-line lapping guide acts as a shunt in the parallel circuit of the embedded read sensor and the in-line lapping guide and, when the in-line lapping guide is completely removed, the highly porous material acts as a buffer to maintain the resistance of the embedded read sensor at a constant value. The viability of the embedded read sensor can thus be ensured. Second, the sensor height, defined by the lithographical patterning as opposed to the mechanical lapping, can be maintained constant during the mechanical lapping. A precise manufacturing control can thus be ensured. Third, the magnetic moments of the sense, reference, and keeper layers can be maintained, while the pinning layer will not corrode, since the embedded read sensor is not exposed to the chemical solution and air at all. A higher signal sensitivity can thus be attained. Fourth, the ABS of the embedded read sensor remains smooth and does not require any protection overcoat. The concern regarding contact with the rotating magnetic disk can thus be alleviated. Because of these advantages, the embedded read sensor formed in this method is suitable for magnetic recording at ultrahigh densities.

The following description is the best embodiment presently contemplated for carrying out this invention. This description is made for the purpose of illustrating the general principles of this invention and is not meant to limit the inventive concepts claimed herein.

Figure 6:
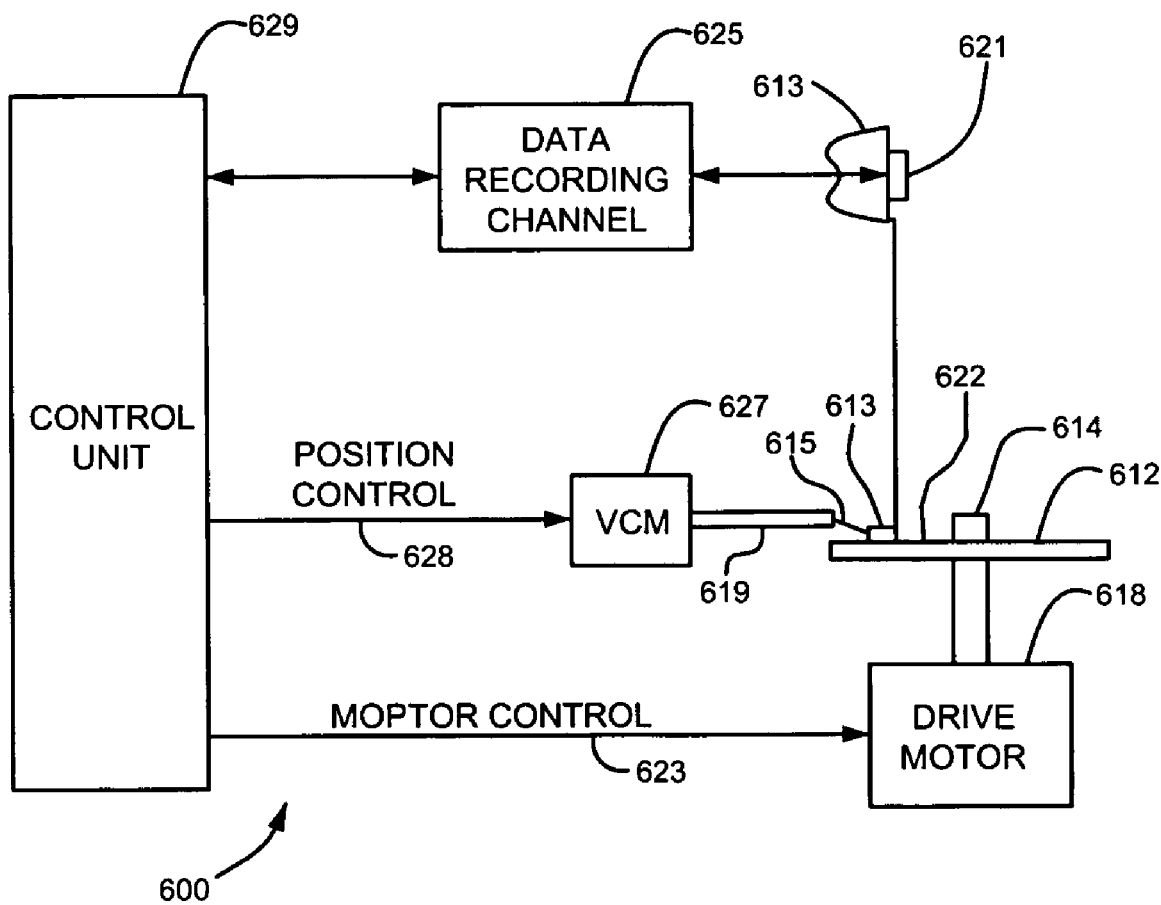
FIG. 6 is a simplified drawing of a magnetic recording disk drive system.

Referring now to FIG. 6, there is shown a disk drive 600 embodying this invention. As shown in FIG. 6, at least one rotatable magnetic disk 612 is supported on a spindle 614 and rotated by a disk drive motor 618. The magnetic recording on each disk is in the form of an annular pattern of concentric data tracks (not shown) on the magnetic disk 612. At least one slider 613 is positioned near the magnetic disk 612, each slider 613 supporting a magnetic head assembly 621. As the magnetic disk rotates, slider 613 is moved radially in and out over the disk surface 622 so that the magnetic head assembly 621 may access different tracks of the magnetic disk where desired data are written. Each slider 613 is attached to an actuator arm 619 by way of a suspension 615. The suspension 615 provides a slight spring force which biases slider 613 against the disk surface 622. Each actuator arm 619 is attached to an actuator means 627. The actuator means 627 as shown in FIG. 6 may be a voice coil motor (VCM). The VCM comprises a coil movable within a fixed magnetic field, the direction and speed of the coil movements being controlled by the motor current signals supplied by controller 629.

During operation of the disk storage system, the rotation of the magnetic disk 612 generates an air bearing between the slider 613 and the disk surface 622 which exerts an upward force or lift on the slider. The air bearing thus counter-balances the slight spring force of suspension 615 and supports slider 613 off and slightly above the disk surface by a small, substantially constant spacing during normal operation.

The various components of the disk storage system are controlled in operation by control signals generated by control unit 629, such as access control signals and internal clock signals. Typically, the control unit 629 comprises logic control circuits, storage means and a microprocessor. The control unit 629 generates control signals to control various system operations such as drive motor control signals on line 623 and head position and seek control signals on line 628. The control signals on line 628 provide the desired current profiles to optimally move and position slider 613 to the desired data track on disk 612. Write and read signals are communicated to and from write and read heads 621 by way of recording channel 625.

The above description of a typical magnetic disk storage system, and the accompanying illustration of FIG. 6 are for representation purposes only. It should be apparent that disk storage systems may contain a large number of disks and actuators, and each actuator may support a number of sliders. The method described herein may be utilized to provide a read sensor and magnetic head for the disk drive of FIG. 6.

Figure 9:
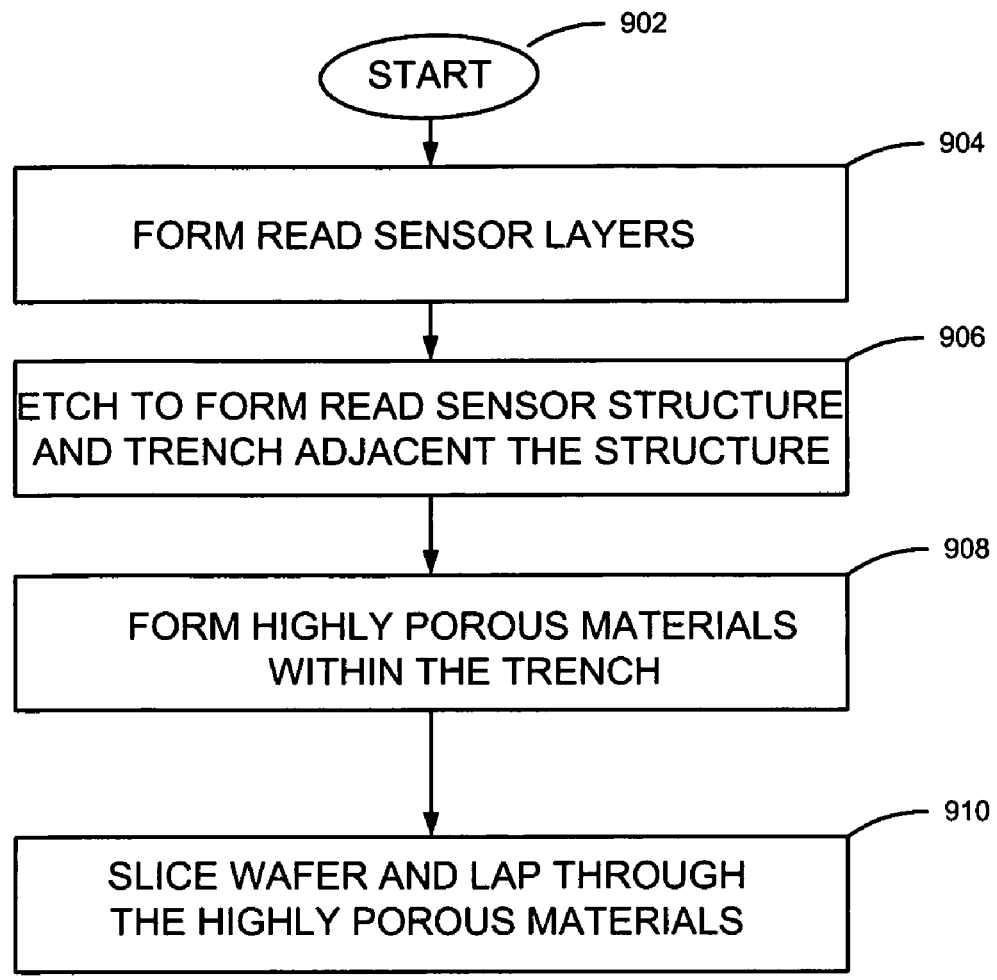
FIG. 9 is a flowchart which describes a method of providing a highly porous material adjacent a read sensor to reduce stress on the read sensor during lapping.

Referring now to FIG. 9, a flowchart which describes the general method of providing a highly porous material adjacent a read sensor to reduce stress on the read sensor during lapping is shown. Beginning at a start block 902 of FIG. 9, a plurality of read sensor layers are deposited over a wafer (step 904 of FIG. 9). Next, an etching process is performed to form a read sensor structure with a trench adjacent the read sensor structure (step 906 of FIG. 9). An in-line lapping guide may be simultaneously formed with the read sensor structure and separated from the read sensor structure by the trench. The etch may be an ion mill utilizing a patterned resist to protect the read sensor and in-line lapping guide during the process. A highly porous material is formed within the trench between the read sensor structure and the in-line lapping guide (step 908 of FIG. 9). As will be described in more detail below, the highly porous material is a material having a yield strength of 150 Megapascals (MPa) or less. Other steps may be performed to complete the formation of read sensor/magnetic head structure. The wafer is then sliced and a lapping process is performed on each sliced wafer (step 910 of FIG. 9). The lapping process is performed through the in-line lapping guide and the highly porous materials until an air bearing surface (ABS) plane of the magnetic head is reached.

The embedded read sensor described herein may be a GMR sensor used in either a Current-In-parallel-to-the-Planes (CIP) or a Current-Perpendicular-to-the-Planes (CPP) mode. Alternatively, the embedded read sensor may be a TMR sensor used in a CPP mode. For simplicity, the following detailed description shall refer to a method of forming an embedded GMR sensor used in a CIP mode, it being understood that the method presented herein is equally applicable to other types of read sensors and that the materials and dimensions are provided by way of non-limiting example only.

Figure 7:
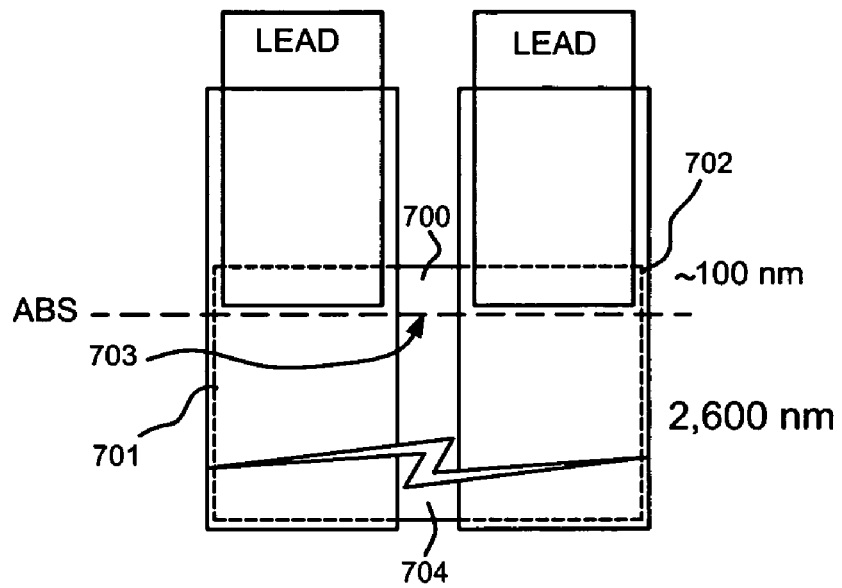
FIG. 7 is a top view of an embedded GMR sensor to be formed according to the method of the present application.
Figure 8:
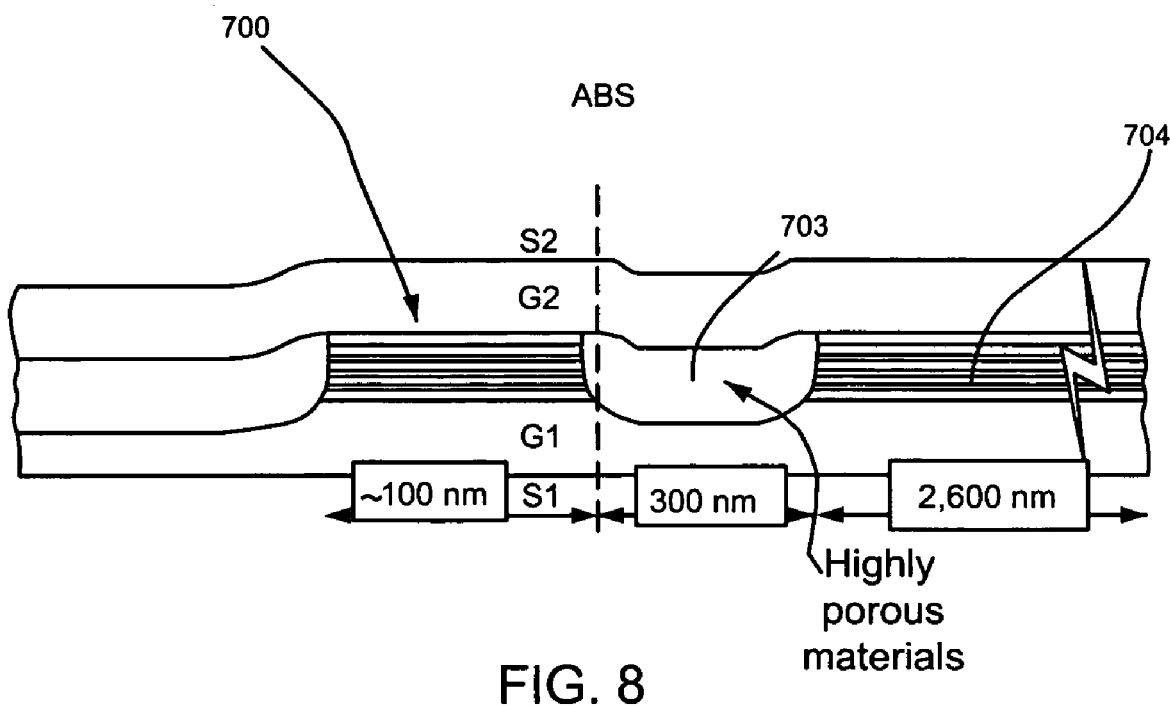
FIG. 8 is a cross-sectional view of an embedded GMR sensor to be formed according to the method of the present application on a plane perpendicular to its ABS.

A more detailed method of fabricating the read sensor is now be described in relation to FIGS. 7 and 8. FIG. 7 illustrates a top view of the embedded GMR sensor 700 to be formed according to the method of the present application. FIG. 8 is a cross-sectional view of the embedded GMR sensor 700 to be formed on the plane perpendicular to its ABS.

To begin, a 1 μm thick Ni—Fe bottom shield layer is deposited and patterned on a wafer. Subsequently, a 20 nm thick $Al_2O_3$ bottom gap layer is formed over the shield layer. Next, a plurality of read sensor layers are formed over the bottom gap layer. The read sensor layers may include a nonmagnetic Ni—Cr—Fe seed layer, ferromagnetic Ni—Fe/Co—Fe sense layers, a nonmagnetic Cu—O spacer layer, a ferromagnetic Co—Fe reference layer, a nonmagnetic Ru antiparallel (AP) exchange-coupling layer, a ferromagnetic Co—Fe keeper layer, and nonmagnetic Cu and Ta cap layers. Exemplary thicknesses of the read sensor layers may be as follows: Ni—Cr—Fe(3)/Ni—Fe(1)/Co—Fe(1.8)/Cu—O(1.8)/Co—Fe(1.7)/Ru(0.8)/Co—Fe(1.7)/Cu(0.6)/Ta(6) films (thickness in nm) which are sequentially deposited on the wafer. A 20 nm thick carbon film may be formed thereover. Note that the layers of the read sensor can be reversed. For example, the embedded GMR sensor may include a nonmagnetic Ni—Cr—Fe seed layer, a ferromagnetic Co—Fe keeper layer, a nonmagnetic Ru AP exchange-coupling layer, a ferromagnetic Co—Fe reference layer, a nonmagnetic Cu—O spacer layer, ferromagnetic Co—Fe/Ni—Fe sense layers, and nonmagnetic Cu and Ta cap layers. Also alternatively, an antiferromagnetic Pt—Mn pinning layer can be sandwiched into the Ni—Cr—Fe seed and Co—Fe keeper layers. Further alternatively, another Ni—Fe seed layer can be sandwiched into the Ni—Cr—Fe seed and Pt—Mn pinning layers.

After the GMR sensor layers are deposited, three lithographic patterning processes are performed. In the first lithographic process, two regions 701 and 702 separated by a trench 703 with a spacing of about 300 nm are formed, one with a designed height of 100 nm and the other with a height of about 2,600 nm. To do this, a monolayer resist is applied and patterned in a lithographic tool to mask two regions 701, 702. The monolayer resist may be a photoresist where a photolithographic tool is utilized. Alternatively, electron beam (e-beam) lithography may be utilized to pattern the resist. Ion milling is then performed to completely remove exposed GMR sensor materials and partially remove exposed gap layer materials.

Next, a 20 nm thick highly porous material is formed into the etched regions, including within trench 703 (see especially FIG. 8). In the present application, a highly porous material is any material having a yield strength of 150 Megapascals (MPa) or less. Preferably, the highly porous material is a material referred to as SiLK™ resin commercially available from the Dow Chemical Company. SiLK™ is a trademark of the Dow Chemical Company. This material has a relatively low yield strength of 60 MPa. This should be compared with the yield strength of alumina ($Al_2O_3$) which is about 5 Gigapascals (GPa) or the yield strength of Permalloy which is 1.6 GPa. It is known that the elasticity modulus of materials decreases with an increase in porosity. For SiLK resin, the pore size is 9 nm with a porosity of 17%. Thus, SiLK material within trench 703 will couple very little mechanical stress to the completed GMR sensor. Note that the SILK resin may be spin-coated within trench 703. Other suitable alternative materials may be utilized, such as methylsilsesquioxane (MSQ), XLK (based on FOx Flowable Oxide), fluoriated silicon glass (FSG), versions thereof, or materials based on one or more of the above, assuming they are within suitable yield strengths.

Note that the invention is not limited to the use of highly porous materials, but is rather more broadly directed to forming a "low stress region" adjacent to the read sensor structure. A low stress region is one in which provides a yield stress of 150 MPa or less, regardless of how or what is used to form it. The low stress region may be a trench without any materials deposited within it (even after all subsequent processing steps). That is, it may be a completely empty void. Preferably, however, the highly porous materials are utilized within the trench for more practical fabrication of the magnetic head. As an alternative, materials having a low elastic modulus may be formed within the trench; the elastic modulus is sufficiently low so as to provide relatively little or no stress to the sensor.

After forming the highly porous material within the trench (in keeping with the preferred embodiment), the monolayer resist is removed. After removing the monolayer photoresist, a chemical mechanical polishing (CMP) is performed to remove unwanted fencings. Reactive ion etching (RIE) may then be used to completely remove the carbon film, and a cap layer of tantalum (Ta) may subsequently deposited over the structure.

In the second lithographic process, a GMR sensor with a designed width of 100 nm and an in-line lapping guide 704 with the same width are formed. The width of the highly porous material within trench 703 is reduced accordingly as well. During this process, a 20 nm thick carbon film is deposited on the wafer, and another monolayer photoresist is applied and patterned in the photolithographic tool to mask the GMR sensor and the in-line lapping guide. Ion milling is applied to completely remove GMR sensor materials and partially remove the gap layer materials in the exposed side regions. Longitudinal bias layers comprising Cr(3)/Co—Pt—Cr(10) films and first conducting layers made of Rh(30)/Ta(3) films are then deposited into the etched side regions. After removing the monolayer photoresist, another CMP is used to remove unwanted fencings and another RIE is used to completely remove the carbon film. Note that the location of the deposited porous material is adjacent and in front of the GMR sensor (in front of ABS) and in between GMR sensor 700 and in-line lapping guide 704. The final dimensions of the porous material trench 703 may be between 150-300 nm (trackwidth dimension) and 100-300 nm (stripe height dimension), for example.

In the third lithographic process, the GMR sensor and the in-line lapping guide are connected to two read head pads. Bilayer photoresists are formed and patterned in the photolithographic tool to mask the GMR sensor, the in-line lapping guide, and their neighboring regions. Second conducting layers made of Ta(3)/Cu(60)/Ta(6) films are then deposited into unmasked regions. After lifting off the bilayer photoresists, a 20 nm thick $Al_2O_3$ top gap layer is deposited over the entire wafer. The fabrication process of a write head, as known to those skilled in the art, then begins.

Figure 11:
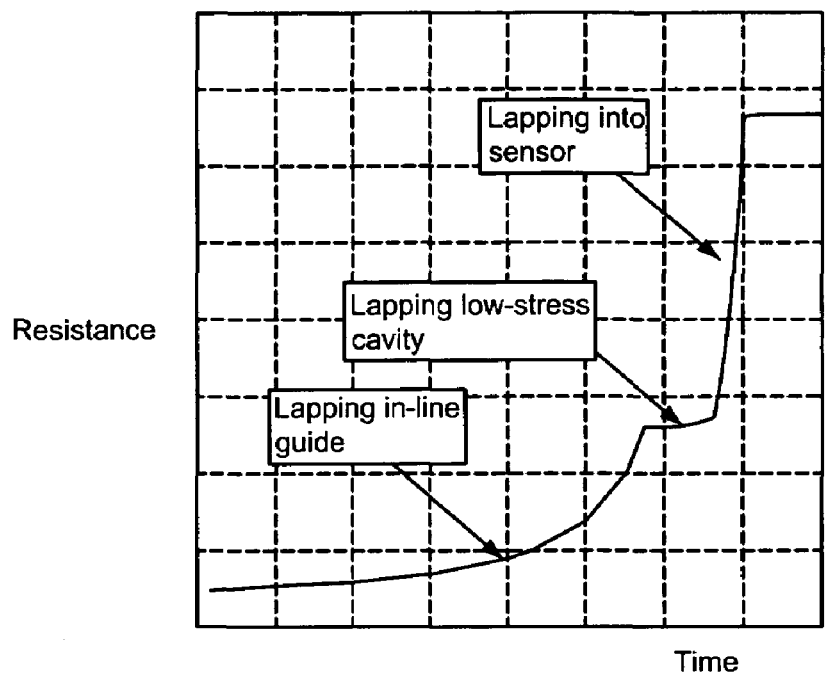
FIG. 11 is a graph depicting exemplary resistance of the parallel circuit of the embedded GMR sensor and the in-line lapping guide as a function of time during a first lapping phase.
Figure 12:
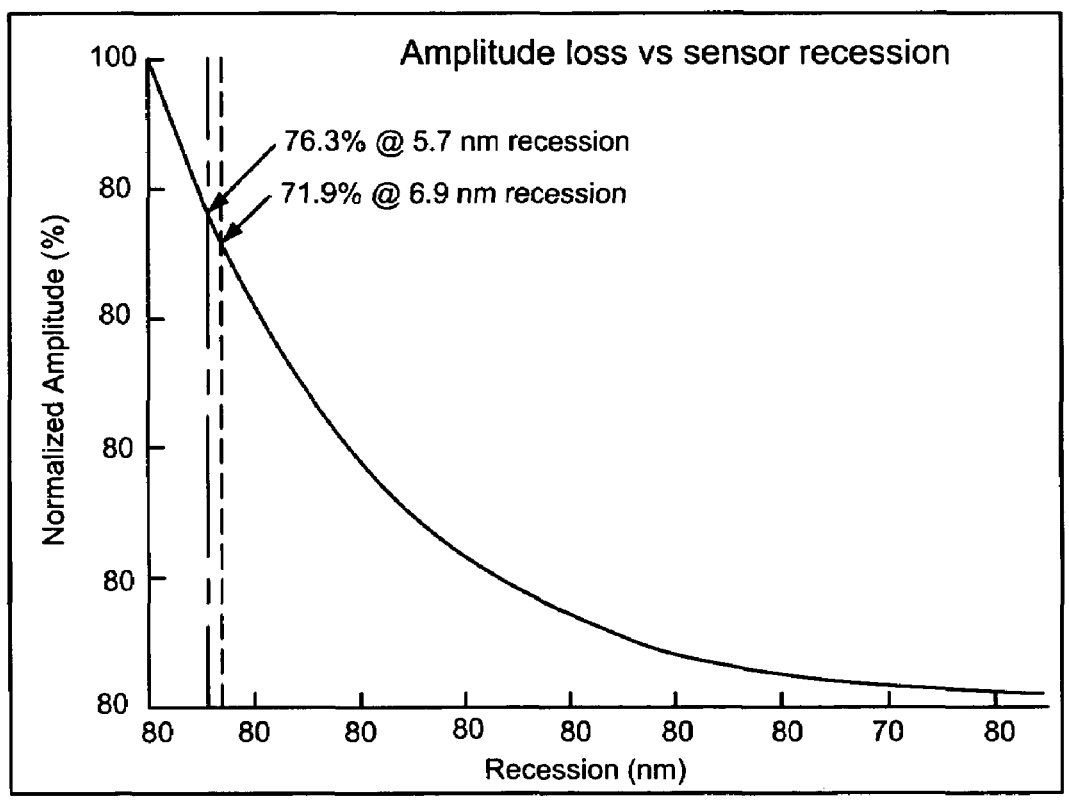
FIG. 12 is a graph depicting exemplary GMR responses of the embedded GMR sensor as a function of spacing from the ABS during a second lapping phase.

After completing the fabrication process of the magnetic head assembly, the wafer is sliced into rows, and each row is sliced into sliders. A mechanical lapping process is then utilized with each slider. In a first lapping phase, a sense current of 1 mA is applied to the parallel circuit of the GMR sensor 700 and the in-line lapping guide 704, and its resistance is measured. FIG. 11 shows the sensor resistance recorded during the first lapping phase after the in-line lapping guide 704 is exposed by lapping. The sensor resistance increases substantially as the in-line lapping guide 704 is partially removed, and eventually reaches a constant as the in-line lapping guide 704 is completely removed. In a second lapping phase, a sense current of 1 mA and a magnetic field parallel to the sensor height are applied, and a change in the resistance of the GMR sensor (i.e. GMR response) is measured. As shown in FIG. 12, this GMR response can be very well characterized by modeling, in which the GMR sensor is assumed to operate with a loss of the spacing of the highly porous material. The mechanical lapping is ceased as the GMR response increases to about 80% of a calculated GMR response without the spacing loss. This corresponds to a point where the ABS plane of the magnetic head is reached.

Figure 14A:
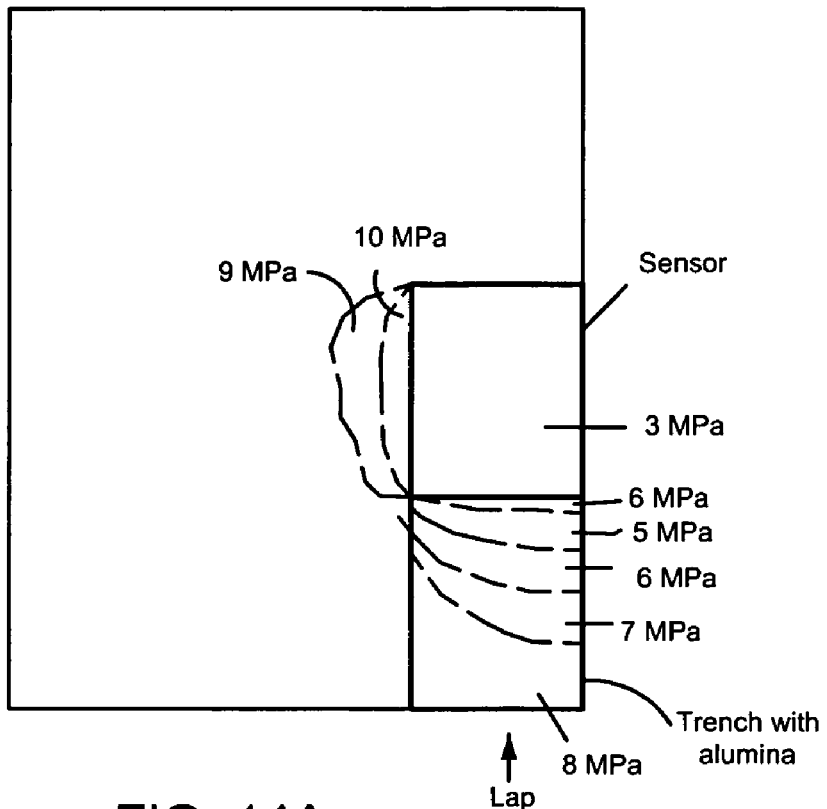
FIGS. 14A and 14B are modelings of the mechanical stress near a GMR sensor without a low stress region (e.g. a trench filled with alumina) and a GMR sensor having a low stress region, respectively.
Figure 14B:
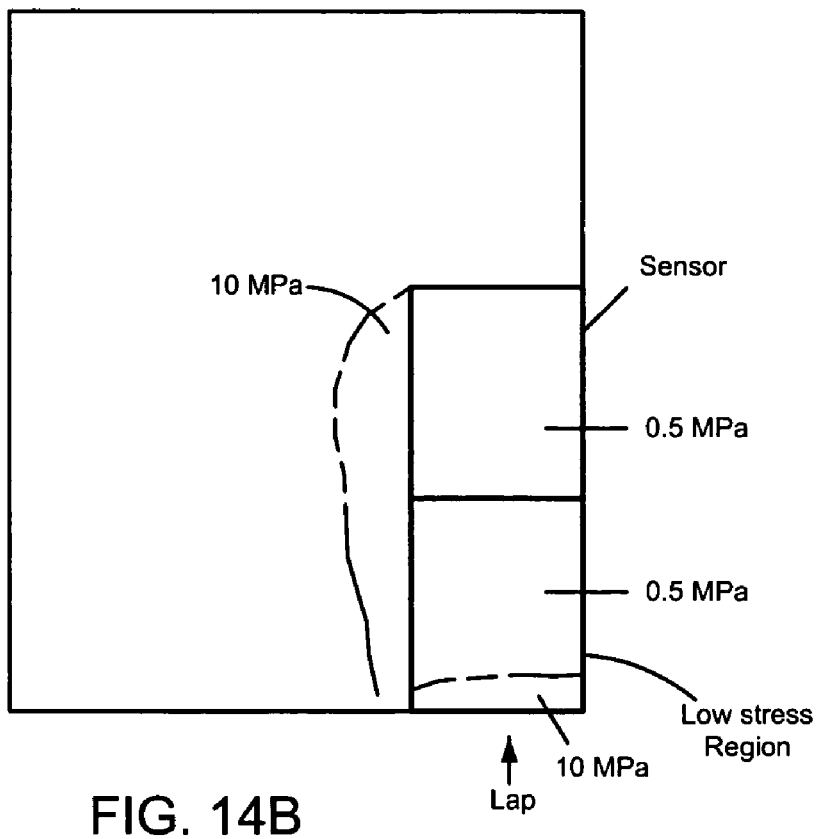
Figure 15:
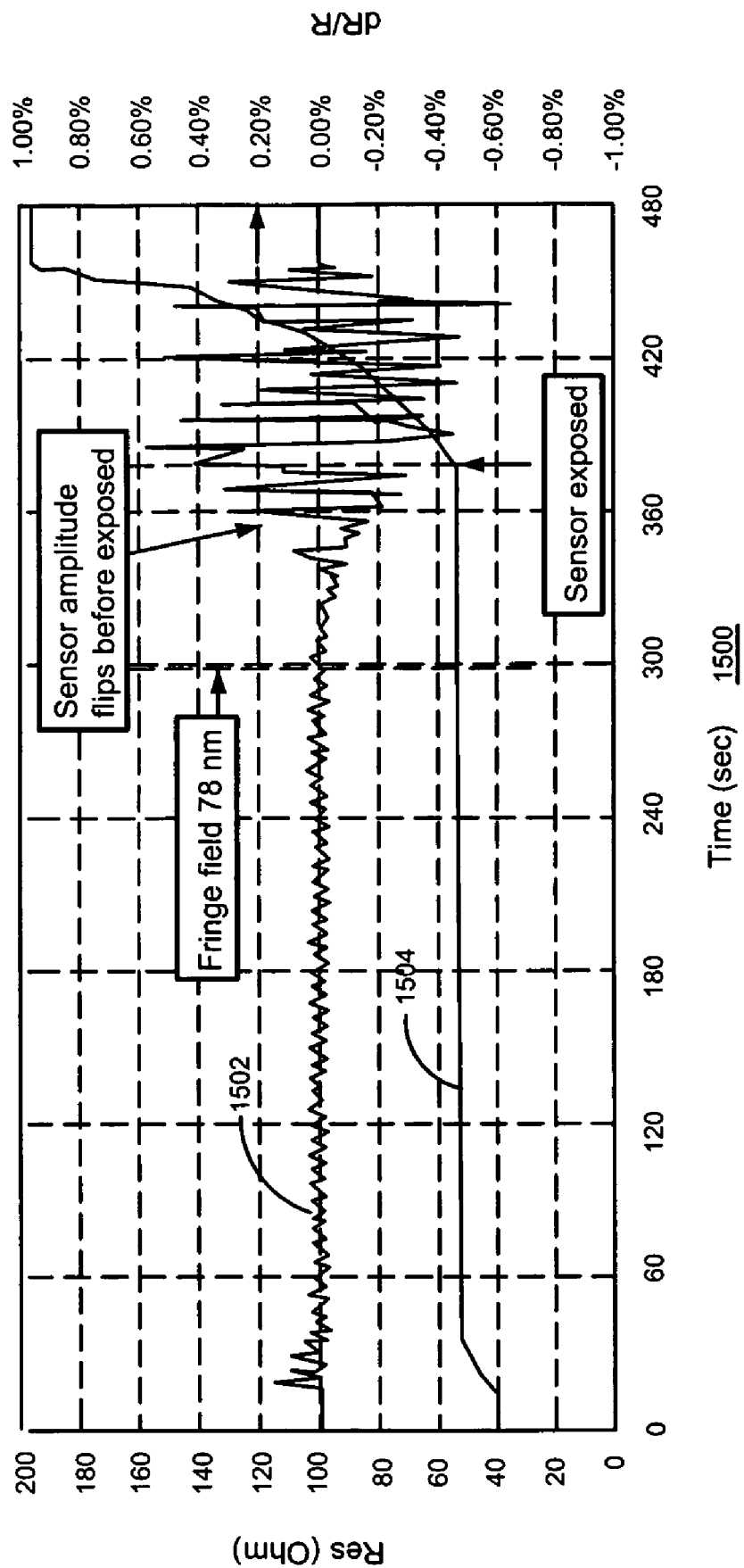
FIG. 15 is a graph showing an amplitude curve and a resistance curve which are based on signals monitored during a lapping process with conventional techniques.

Note that the highly porous material in front of the read sensor structure reduces mechanical stress on the read sensor during this lapping process. This reduces the likelihood that the amplitude of the read sensor will be degraded or set in a "flipped" or reversed orientation, as well as reduces the likelihood that electrostatic discharge (ESD) damage to the read sensor will occur. To illustrate, FIGS. 14A and 14B show stress fields of sensors during lapping which are based on an ANSYS® finite-element model (ANSYS is a registered trademark of ANSYS, Inc.). In particular, FIG. 14A shows the stress field for a sensor without a low stress region of the present invention, but rather with a trench filled with alumina. In FIG. 14A, the sensor experiences a stress of about 3 MPa when the externally applied stress is 10 MPa. This represents about a 70% reduction of stress as compared to a conventional read sensor without any trench-filled region. FIG. 14B shows the stress field for a sensor with the low stress region of the present invention. It shows that the sensor stress level drops further to 0.5 MPa with use of the high porosity material. This is an additional reduction of 25% of the stress of the conventional sensor.

Figure 10:
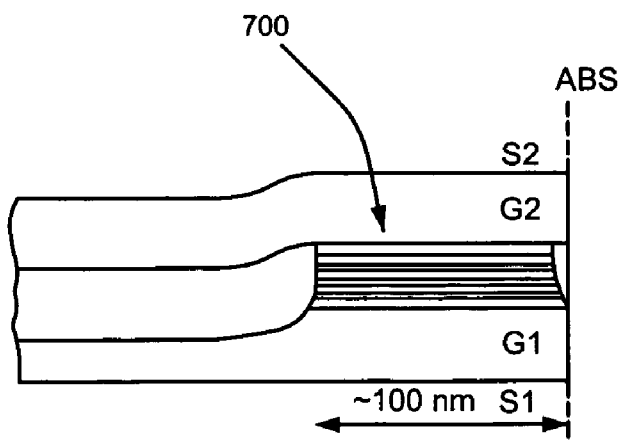
FIG. 10 is a cross-sectional view of an embedded GMR sensor after lapping is performed.
Figure 13:
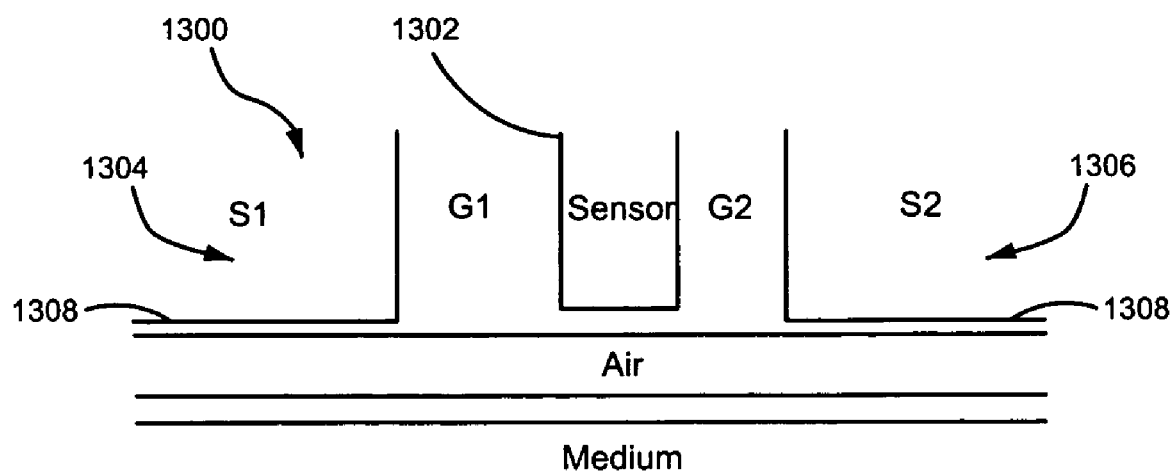
FIG. 13 is a cross-sectional view of a magnetic head assembly fabricated according to the method of the present application on a plane perpendicular to its ABS.

FIG. 10 is a cross-sectional view of the resulting embedded GMR sensor 700 after the mechanical lapping process. Note that most if not all of the highly porous materials in front of the embedded GMR sensor 700 are removed during the lapping. FIG. 13 further illustrates the cross-sectional view of a magnetic head assembly 1300 fabricated from the method of the present application. After forming the embedded GMR sensor 1302, either natural or plasma oxidation at either a room or high temperature ($\geq 240°$ C.) is applied to the magnetic head assembly 1300. While the embedded GMR sensor 1302 remains intact, two shields 1304 and 1306 of the write head are protected with oxides 1308. Since the embedded GMR sensor is recessed by the oxide overcoat from the air bearing, it should be ensured that there are no adverse effects from the recession on the read resolution.

Final Comments. A method of fabricating a read sensor of a magnetic head has been described. The method may include the steps of forming a plurality of read sensor layers on a wafer; etching the read sensor layers to form a read sensor structure with a trench in front of the read sensor structure; forming a highly porous material within the trench; and slicing the wafer and lapping the sliced wafer through the highly porous material until an ABS of the magnetic head is reached. Advantageously, the highly porous material in front of the read sensor structure reduces mechanical stress on the read sensor during the lapping process. This reduces the likelihood that the amplitude of the read sensor will be degraded or set in a "flipped" or reversed orientation, as well as reduces the likelihood that ESD damage to the read sensor will occur.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of fabricating a read sensor, comprising:
    forming a plurality of read sensor layers on a wafer;
    forming a resist structure over the read sensor layers in a central region;
    etching, with the resist structure in place, the read sensor layers for forming a read sensor structure and a trench adjacent the read sensor structure;
    forming, within the trench, a highly porous material in contact with the read sensor structure and in front of a magnetic sensing plane thereof; and
    slicing the wafer and lapping through the highly porous materials toward the read sensor structure for defining the magnetic sensing plane.

2. The method of claim 1, wherein the highly porous material comprises a material having a yield strength of 150 Megapascals (MPa) or less.

3. The method of claim 1, wherein the highly porous material in front of the read sensor structure reduces stress on the read sensor during the act of lapping.

4. The method of claim 1, wherein the highly porous material in front of the read sensor structure reduces the likelihood of electrostatic discharge (ESD) damage to the read sensor structure during the act of lapping.

5. The method of claim 1, further comprising:
    wherein the act of etching the read sensor layers comprises forming an in-line lapping guide with the read sensor structure.

6. The method of claim 1, further comprising:
    wherein the act of etching the read sensor layers comprises forming an in-line lapping guide with the read sensor structure; and
    terminating the act of lapping based on signals from the in-line lapping guide.

7. The method of claim 1, further comprising:
    wherein the act of etching comprises ion milling, with the resist structure in place, to form the read sensor structure and the trench adjacent the read sensor structure.

8. The method of claim 1, further comprising: forming the trench in the resist-structure with use of electron beam (e-beam) lithography.

9. The method of 1, wherein the read sensor is part of a magnetic head and the lapping is performed until an air bearing surface (ABS) of the magnetic head is reached.

10. A method of fabricating a read sensor of a magnetic head, comprising:
    forming a plurality of read sensor layers on a wafer;
    forming a resist structure over the read sensor layers in a central region;
    etching, with the resist structure in place, the read sensor layers for forming a read sensor structure and a trench adjacent the read sensor structure;
    forming, within the trench, a porous material in contact with the read sensor structure and in front of an air bearing surface (ABS) plane of the magnetic head, the porous material having a yield strength of 150 Megapascals (MPa) or less; and
    slicing the wafer and lapping the sliced wafer through the highly porous materials toward the read sensor structure for defining the ABS.

11. The method of claim 10, wherein the porous material in contact with the read sensor structure reduces stress on the read sensor during the act of lapping.

12. The method of claim 10, wherein the porous material in contact with the read sensor structure reduces the likelihood of electrostatic discharge (ESD) damage to the read sensor structure during the act of lapping.

13. The method of claim 10, further comprising:
    wherein the act of etching the read sensor layers comprises forming an in-line lapping guide with the read sensor structure.

14. The method of claim 10, further comprising:
    wherein the act of etching the read sensor layers comprises forming an in-line lapping guide with the read sensor structure; and
    terminating the act of lapping based on signals from the in-line lapping guide.

15. The method of claim 10, further comprising:
    wherein the act of etching comprises ion milling, with the resist structure in place, to form the read sensor structure and the trench adjacent the read sensor structure.

* * * * *